(12) United States Patent
Narita (10) Patent No.: US 7,949,120 B2
(45) Date of Patent: May 24, 2011

(54) INFORMATION PROCESSING SYSTEM IN WHICH INFORMATION EXPRESSING A CURRENT TIME POINT IS TRANSMITTED FROM ONE COMPUTER TO ANOTHER FOR USE IN CALCULATING AN AMOUNT OF DELAY IN TRANSFERRING DATA BETWEEN THE COMPUTERS

(75) Inventor: Nobuaki Narita, Kariya (JP)

(73) Assignee: DENSO Corporation, Kariya, Aichi-pref. (JP)

( * ) Notice: Subject to any disclaimer, the term of this patent is extended or adjusted under 35 U.S.C. 154(b) by 1353 days.

(21) Appl. No.: 11/371,161

(22) Filed: Mar. 9, 2006

(65) Prior Publication Data

US 2006/0206613 A1    Sep. 14, 2006

(30) Foreign Application Priority Data

Mar. 9, 2005   (JP) ................................ 2005-065437

(51) Int. Cl.
*H04M 5/00*    (2006.01)
(52) U.S. Cl. ........ 379/243; 709/227; 709/248; 709/224; 713/375; 713/400; 379/420.01; 379/420.02; 379/420.03
(58) Field of Classification Search .................. 379/243, 379/420.01–420.03; 709/227, 224, 248; 713/375, 400
See application file for complete search history.

(56) References Cited

U.S. PATENT DOCUMENTS

| 6,302,439 | B1* | 10/2001 | McCurdy ....................... 280/735 |
| 6,373,146 | B2* | 4/2002 | Horikoshi et al. ............ 307/10.1 |
| 6,560,648 | B1* | 5/2003 | Dunn et al. .................... 709/224 |
| 6,587,877 | B1* | 7/2003 | Douglis et al. ................ 709/224 |
| 6,820,000 | B2 | 11/2004 | Miyano et al. |
| 2002/0000753 | A1* | 1/2002 | Horikoshi et al. ............. 307/9.1 |
| 2002/0175507 | A1* | 11/2002 | Kobayashi et al. ........... 280/735 |
| 2005/0159869 | A1 | 7/2005 | Tohdo et al. |
| 2006/0053211 | A1* | 3/2006 | Kornerup et al. ............. 709/217 |

FOREIGN PATENT DOCUMENTS

| JP | 07-281732 | 10/1995 |
| JP | 2003-025952 | 1/2003 |
| JP | 2003-043174 | 2/2003 |
| JP | 2003-138980 | 5/2003 |
| JP | 2005-201144 | 7/2005 |

OTHER PUBLICATIONS

Office Action issued in Japanese Patent Appln. No. 2006-062709 (Aug. 17, 2010).

* cited by examiner

*Primary Examiner* — William J Deane
(74) *Attorney, Agent, or Firm* — Nixon & Vanderhye P.C.

(57) ABSTRACT

In a system in which a first computer transmits data to a second computer, the first computer transmits data conveying time information to the second computer, with the information expressing a first time point that occurs prior to commencement of the transmission and, following reception of the time information, the second computer compares the first time point information with a current time point, to thereby obtain a communication delay amount that includes a delay in transmitting data from the first to the second computer.

13 Claims, 7 Drawing Sheets

INFORMATION PROCESSING SYSTEM IN WHICH INFORMATION EXPRESSING A CURRENT TIME POINT IS TRANSMITTED FROM ONE COMPUTER TO ANOTHER FOR USE IN CALCULATING AN AMOUNT OF DELAY IN TRANSFERRING DATA BETWEEN THE COMPUTERS

CROSS-REFERENCE TO RELATED APPLICATIONS

This application is based on and incorporates herein by reference Japanese Patent Application No. 2005-065437 filed on Mar. 9, 2005.

BACKGROUND OF THE INVENTION

1. Field of Application

The present invention relates to an information processing system having a plurality of computers which perform mutual data communication, such as a plurality of microcomputers of an ECU (Electronic Control Unit).

In particular, the invention relates to such an information processing system, in which one computer performs calculation processing based on values that are transmitted from another of the computers 2. Description of Related Art Types of information processing system are known such as an ECU for controlling equipment of a motor vehicle (e.g., as described in Japanese patent publication No. 2003-138980), made up of a plurality of microcomputers which mutually exchange data. With such an ECU for example, one of the microcomputers may perform control of the vehicle engine operation, and control of the degree of throttle opening control, while a second microcomputer may perform judgement of operating conditions of the vehicle based upon detection signals that are supplied to it from sensors, etc.

When a plurality of microcomputers function cooperatively in such an ECU, and a microcomputer performs calculation processing based on values that are transmitted to it from another of the microcomputers, then it may be necessary for the first-mentioned microcomputer to take into account (in performing the calculation processing) the amount of time required to transfer data from one microcomputer to another, with that time amount being referred to in the following as the data communication delay. For example there will be a certain amount of deviation between the time point at which a calculation is performed by the receiving microcomputer and the time point at which a (received) value used in that calculation was acquired by the transmitting microcomputer, resulting in an error in the calculation results.

Proposals have been made to obtain an estimated value of such a data communication delay beforehand, based upon theoretical calculations, and for the receiving microcomputer to use that estimated value to compensate the calculation processing such as to eliminate the effects of the data communication delay.

However it is found in practice that there is a large amount of error in such estimated values that are derived based upon theoretical calculations. Hence when these are used, the calculation processing must be modified to take into account the extent of such error.

For example, a value derived by a first microcomputer may be transmitted from the first microcomputer to be compared with a reference value by a second microcomputer and a judgement made by the second microcomputer, based on the comparison results, as to whether the derived value is normal. If compensation is applied for the data communication delay based upon theoretical calculations performed beforehand, then due to the excessive amount of possible error, it is necessary to make the range of detected values that are judged "abnormal" excessively wide.

Alternatively, it may be attempted to decrease the effects of such an error by increasing the amount of time taken to perform the judgement.

Hence, the use of such theoretically calculated values of data communication delay may have an adverse effect upon the overall operation of such an information processing system.

SUMMARY OF THE INVENTION

It is an objective of the present invention to overcome the above problem, by providing an information processing system in which an actual value of delay in transferring data from one computer to another can be directly obtained and utilized, rather than a value that has been established beforehand based on theoretical calculations.

To achieve the above objective, basically the invention provides an information processing system in which two or more computers perform mutual data communication, and in which:

(a) each of the computers can access a timer count value, as information expressing the current time point, (b) at regular or irregular intervals a first computer transmits, to a second computer, information expressing a first time point, i.e., expressing a time point occurring prior to commencement of the transmission, and (c) the second computer utilizes the resultant received first time point information, in conjunction with information expressing a second time point value (expressing the current time at a point subsequent to receiving the first time point information) to calculate the difference between the first and second current time points, as a data communication delay amount which includes a time interval required to transmit data from the first to the second computer.

Respective time counters are provided in each computer, with these time counters operated to maintain substantially identical count values, or count values having a known fixed difference, with counting by each of the time counters having being initiated (reset) at a common reference time point.

More specifically, according to a first aspect, the invention provides an information processing system comprising a first computer and second computer which mutually communicate via a data communication line, and respectively incorporate a first time counter and a second time counter, for deriving time information expressing successive current time points and for providing the time information to each of the first computer and second computer. The first computer comprises first communication means for communicating with the second computer via the data communication line and the second computer comprises second communication means for communicating with the first computer via the data communication line. Such a system is characterized by the following features.

The first communication means (periodically, or at irregular intervals) transmits information expressing a first time point as measured by the first time counter via the data communication line to the second communication means.

The second computer comprises delay calculation means for receiving, from the second communication means, the time point information transmitted from the first communication means, and calculating an amount of delay in transferring data from the first to the second computer, based on a time point that is currently measured by the second time counter and on the received time point information. That delay amount includes an amount of delay in transmitting data from the first communication means to the second communication means via the data communication line.

In that way, the actual delay which occurs in transferring data from the first computer to the second computer (referred to in the following as the data communication delay) is derived directly from respective time point values that are measured using the first time counter and second time counter. Hence, the problems of excessive errors in an estimated value of data communication delay that has been derived based on theoretical calculations as described above can be effectively eliminated.

If the data communication delay for the case of transmitting data from the first computer to the second computer is known to be identical to the data communication delay for the case of transmitting data from the second computer to the first computer, then it would be possible for the first computer (when it receives data transmitted from the second computer) to use a data communication delay value that has been calculated by the second computer. However preferably, for maximum accuracy of determining the data communication delay, it is preferable that in each case, the receiving computer itself calculates the data communication delay when data are transmitted to it from another computer. According to another aspect, with such an information processing system, the system may be configured such that the first communication means also transmits (at regular or irregular intervals) respective data values. Each data value is transmitted in conjunction with a corresponding time point value, measured by the first time counter. Each data value constitutes information other than time point information. These data values and their accompanying time point values are transmitted to the second communication means of the second computer via the data communication line.

In that case, the second computer performs calculation processing based on the received data values, and applies compensation to the calculation processing based upon the respective values of data communication delay which it derives for the received data values as described above.

In that way, the second computer can obtain a calculation result which is unaffected by the data communication delay. That is, the second computer can obtain substantially the same calculation result as if it were operating only on previously generated information. Here "previously generated information signifies information (received data value) that was generated at a time point that precedes the current time point by the aforementioned communication delay amount.

Each received data value can consist of an input value that is supplied to the first computer from an input apparatus, i.e., with such input values being conveyed in respective ones of the aforementioned specific data sets, transmitted from the first to the second computer.

For example the input apparatus of the first computer may be a sensor which detects successive values of a physical quantity, with these physical quantity values being conveyed to the second computer in respective specific data sets. In that case, the second computer can use the derived value of data communication delay to apply compensation to each calculation that is performed using such a physical quantity value, received from the first computer. The compensation can be applied such that the calculation result will be substantially identical to a calculation result obtainable if the physical quantity value were transferred directly to the second computer with no delay.

In particular, when the input apparatus comprises a first sensor, for deriving successive detected values of a first physical quantity, with the aforementioned sets of input data respectively expressing the detected values, the second computer may receive successive detected values of a second physical quantity from a second sensor, with the second physical quantity being different from the first physical quantity. With such a system, the second computer can repetitively perform a calculation based on a combination of a detected value of the second physical quantity, received by the second computer at the current time point, and a received detected value of the first physical quantity. The second computer can apply compensation to the calculation process based upon the value of communication delay, such as to compensate for the effects of that delay.

It thereby becomes possible to eliminate errors in the calculation results that would otherwise occur due to a deviation between the current time point (i.e., at which a calculation is executed) and the time point of acquiring the detected value (used in that calculation) of the first physical quantity.

Preferably the first communication means of the first computer transmits, to the second communication means, each detected value of the first physical quantity together with time point information expressing the time point at which that detected value was acquired by the first computer.

The first time counter and second time counter are configured to perform counting at the same rate. Each of the first and second computers is preferably configured to respond to occurrence of a predetermined specific event by concurrently resetting the corresponding one of the first and second time counters. Alternatively, the computers may be configured to respectively respond to two events which are substantially concurrent, by substantially concurrently resetting the corresponding one of the first and second time counters. Here, "substantially concurrent" as applied to two events signifies that a time difference between their respective occurrences is negligible by comparison with the communication delay amount.

In that way it can be ensured that (following the resetting), the counters will maintain respectively identical count values (or count values having a predetermined fixed difference).

This resetting may be performed for example in response to an event which occurs during initialization processing, after system power is switched on. For example the first computer may transmit a clock signal to the second computer (e.g., for enabling serial transmission of data). In that case, the first computer can be configured to reset the first time counter at the time point when transmission of the clock signal is commenced, while the second microcomputer is configured to reset the second time counter at the time point when the clock signal begins to be received.

Alternatively, the resetting may be performed in response to each occurrence of a specific event, such as initiation of receiving a signal in common by both of the first computer and second computer. The only essential requirement is that such an event is detected substantially concurrently by each of the computers of the system, and that counter resetting is not performed during a transfer of time point data between computers.

As a further alternative, the time counters of the two computers may be respectively reset in response to first and second events which differ in time by a predetermined (non-negligible) fixed amount. In that case, a known fixed difference will be maintained between the respective count values (expressing respective measured current time values) of the two time counters.

DESCRIPTION OF PREFERRED EMBODIMENTS

Figure 1:
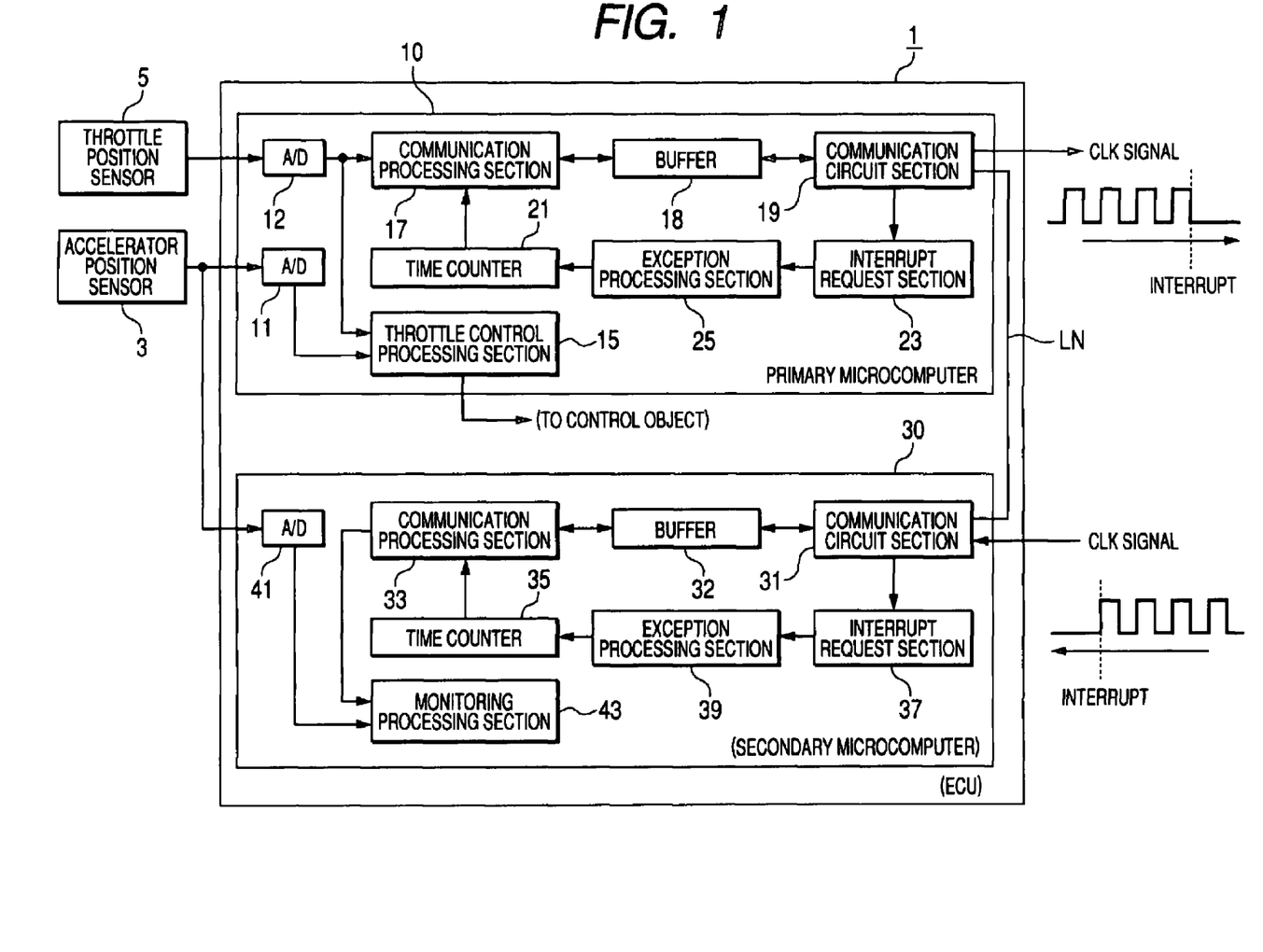
FIG. 1 is a general system block diagram of an embodiment of an ECU having a plurality of microcomputers.

FIG. 1 is a general system block diagram of an embodiment of an electronic control unit (hereinafter abbreviated to ECU), designated by reference numeral 1, for use in a motor vehicle. The function of the ECU 1 is to control the throttle of the vehicle in which it is installed, in response to actuation of the accelerator pedal of the vehicle by the driver. The ECU 1 is connected to receive an (analog) sensor signal generated by an accelerator position sensor 3, which detects the extent to which the accelerator pedal is currently actuated, with that extent being referred to in the following as the accelerator actuation amount. The ECU 1 is also connected to receive an (analog) sensor signal generated by a throttle position sensor 5, which detects the extent to which the throttle of the vehicle is currently opened, with that extent being referred to in the following as the throttle opening amount.

The ECU 1 includes a primary microcomputer 10, which controls the throttle opening amount based on the accelerator actuation amount, and also performs checking as to whether the throttle opening amount is actually appropriate. The ECU 1 further includes a secondary microcomputer 30, whose function is to ensure safety of vehicle operation, by performing double-checking of whether each value of throttle opening amount derived by the primary microcomputer 10 is actually appropriate.

The primary microcomputer 10 includes two A/D converters 11 and 12, a throttle control processing section 15, communication processing section 17, a buffer 18, a communication circuit section 19 that is connected to a data communication line LN that links the primary microcomputer 10 and secondary microcomputer 30, a time counter 21, an interrupt request section 23 and an exception processing section 25.

The secondary microcomputer 30 includes an A/D converter 41, having an identical function to the A/D converter 11 of the primary microcomputer 10, a buffer 32, communication processing section 33, a time counter 35, an interrupt request section 37, an exception processing section 39, a monitoring processing section 43, and a communication circuit section 31 that is connected to the data communication line LN.

The communication circuit section 19 and the communication circuit section 31 of this embodiment respectively correspond to first communication means and second communication means, as recited in the appended claims.

It should be noted that the term "processing section" is used herein in relation to the internal configuration of a microcomputer to signify a combination of internal constituents of the microcomputer, including a CPU, ROM, RAM, registers, etc., which execute functions under software control.

The time counters 21 and 35 are of respectively identical configuration, and operate from timing clock signals of identical frequency. If for example the ECU 1 communicates with other ECUs via a CAN (Controller Area Network) bus, then a CAN timing reference signal, for use in such communication, will be available to each of microcomputers 10, 30 and so can be used to synchronize the timing clock signals The A/D converter 11 is connected to receive the aforementioned sensor signal from the accelerator position sensor 3, whose value indicates the accelerator actuation amount, and converts successive sample values of that signal to respective digits values that are applied to the throttle control processing section 15. The A/D converter 12 is connected to receive the aforementioned sensor signal from the throttle position sensor 5, whose value indicates the throttle opening amount, and converts that signal to successive digital values that are supplied to the communication processing section 17 and also to the throttle control processing section 15.

The throttle position sensor 5 and acceleration position sensor 3 of this embodiment are respective examples of a first sensor and a second sensor, as recited in the appended claims. The interrupt request section 23 and the exception processing section 25, in combination, correspond to first resetting means, as recited in the appended claims. The interrupt request section 37 and the exception processing section 39, in combination, correspond to second resetting means, as recited in the appended claims.

In the following a currently derived accelerator actuation amount, outputted as a digital data from the A/D converter 11, will be designated as A1. That value is used by the throttle control processing section 15 in conjunction with information expressing various current operating conditions of the vehicle, to perform throttle control by determining a corresponding value for the throttle opening amount. For simplicity of description, the sources of such information expressing various current operating conditions of the vehicle are omitted from the drawings. In addition, the throttle control processing section 15 performs processing to determine whether or not the current amount of throttle opening is appropriate, based on the actual throttle opening amount that is currently being detected by the throttle position sensor 5 and supplied as a digital value from the A/D converter 12 as described above, with that detected value of throttle opening amount being designated in the following as B1

If the detected value B1 is judged to be appropriate, i.e., "normal", then control of the throttle opening amount by the throttle control processing section 15 is continued, whereas if B1 is judged to be inappropriate, i.e., "abnormal", then error handling processing is executed by the throttle control processing section 15, whereby the throttle opening amount is reduced to zero.

Figure 2:
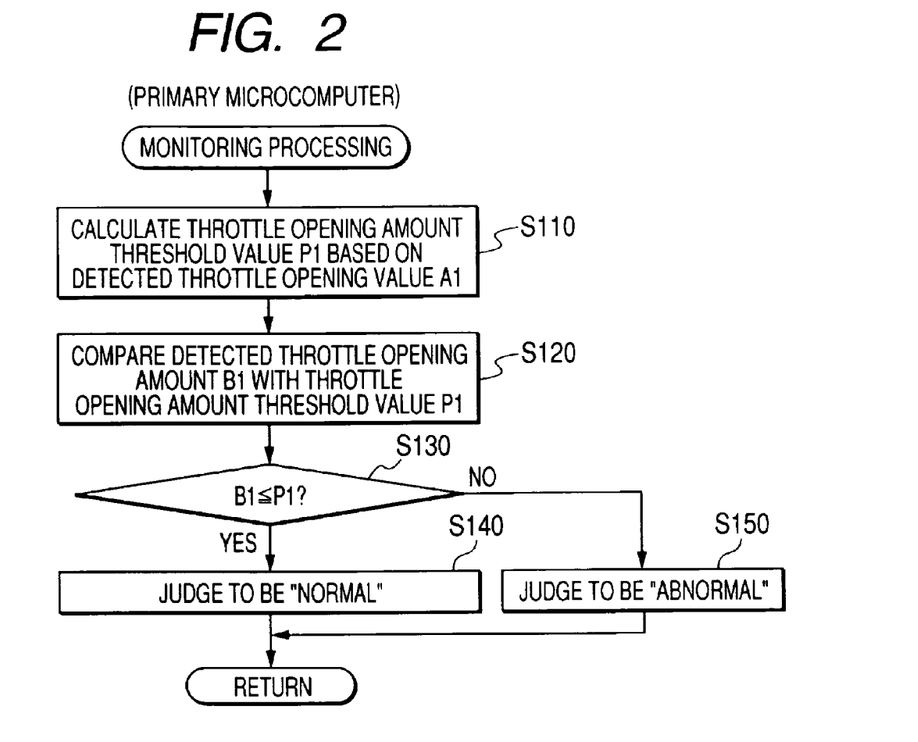
FIG. 2 is a flow diagram showing a monitoring processing routine executed by a primary microcomputer of the embodiment.

FIG. 2 is a flow diagram for describing a monitoring processing routine that is repetitively executed by the throttle control processing section 15. Firstly, in step S1 of that routine, a throttle opening threshold value P1 is calculated, which is an upper limit value for the throttle opening amount. The value of the throttle opening threshold value P1 is calculated with this embodiment by using a predetermined function F(A1), with the currently obtained detection value A1 for the accelerator actuation amount as a parameter, i.e., $$P1 = F(A1)$$

This function may be in the form:

$$P1 = F(A1) = \alpha \cdot A1 + \beta$$

where $\alpha$, $\beta$ are constants.

However various other methods could be envisaged for deriving each value of P1, so that it should be understood that the invention is not limited to using the above function for calculating the throttle opening threshold value P1 in step S110 of FIG. 2.

Next, in step S120, the throttle control processing section 15 compares the throttle opening threshold value P1 with the detected value of throttle opening amount BE obtained from the throttle position sensor 5. A decision is then made as to whether or not P1 is higher than B1. If B1 is less than or equal to P1 (YES decision in step S130) then this is taken to signify that the actual throttle opening amount is appropriate ("normal" judgement result obtained in step S140), while if B1 is not less than or equal to P1 (NO decision in step S130), then this is taken to signify that the detected value of throttle opening amount is not appropriate ("abnormal" judgement result obtained in step S150).

On completion of step S140 or step S150, this execution of the monitoring processing routine is ended.

Each time this routine is executed, the respective currently derived values of the throttle opening threshold value P1 and detected value B1 are utilized.

The primary microcomputer 10 inserts each digital value produced from the A/D converter 12, and the corresponding count value derived by the time counter 21 at that time (as information expressing the current time point), into a set of transmission data to be transmitted to the secondary microcomputer 30. Each such transmission data set is temporarily stored in the buffer 18. In addition, data received by the communication circuit section 19 from the secondary microcomputer 30 are temporarily stored in the buffer 18, which can consist of a specific region in the RAM of the primary microcomputer 10. Transmission data that are held in the buffer 18 are processed by the communication circuit section 19 into a format for serial communication, and transmitted in a serial bit stream via the data communication line LN to the secondary microcomputer 30.

Figure 3:
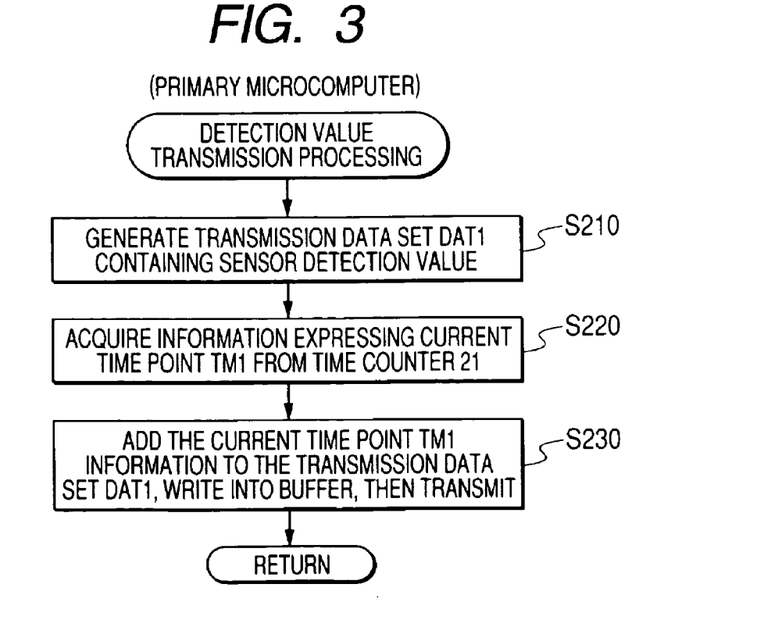
FIG. 3 is a flow diagram of a detected value transmission processing routine that is executed by the primary microcomputer.

FIG. 3 is a flow diagram of a detected value transmission processing routine that is repetitively executed by the communication processing section 17 to perform this data transmission.

Firstly, in step S210, the communication processing section 17 generates a transmission data set DAT1, containing the most recently derived detected value of throttle opening amount (B1). The communication processing section 17 then acquires the current count value of the time counter 21, as time information expressing a time point TM1 (step S220).

That time information is then attached to the transmission data set DAT1, and the resultant data set temporarily stored in the buffer 18 before being transmitted vi the communication circuit section 19 and the data communication line LN to the communication circuit section 31 of the secondary microcomputer 30 (step S230). On completion of step S230, this execution of the detected value transmission processing routine is ended.

Similarly, in the next execution of the detected value transmission processing routine, a new set of current time point TM1 information and transmission data DAT1 are read out of the buffer 18 and transmitted to the secondary microcomputer 30.

With this embodiment, the amount of time taken to load data into the buffer 18, subsequently transmit the data via the communication line LN to the secondary microcomputer 30, load the received data into the buffer 32, then read out the data and commence to apply the received data in performing a calculation, is sufficiently long that it cannot be ignored. That time amount corresponds to a "communication delay amount" recited in the appended claims. This is the reason for attaching the information expressing time point TM1 to the transmission data DAT1, i.e., to enable the secondary microcomputer 30 to determine the length of time that has been required to obtain and commence to utilize transfer the information conveyed in the transmission data DAT1 (in relation to the current time point).

For the secondary microcomputer 30 to be able to accurately determine that time duration, it is necessary for the time counter 21 of the primary microcomputer 10 and the time counter 35 of the secondary microcomputer 30 to measure respectively identical values of elapsed time in relation to the current time. However if there is a deviation between respective time axis values represented by the count values of the time counters 21, 35, i.e., they do not maintain identical (successively increasing) count values or respective count values that differ by a fixed predetermined amount, the current time point TM1 information received by the secondary microcomputer 30 cannot be accurately compared with the current count value of the time counter 35, to calculate the delay in transferring information such as a sensor detection value from the microcomputer 10 to the secondary microcomputer 30.

For that reason, with this embodiment, each of the time counters 21 and 35 are reset simultaneously when a specific event (which can be detected concurrently by both the of the microcomputers 10, 30) occurs prior to using their respective count values for deriving current time information. In the following, such an event will be referred to as a "concurrent event". With this embodiment, it will be assumed that the concurrent event occurs at system initialization, after operating power of the system is switched on, and that the event consists of the commencement of supplying a clock signal (designated as CLK) from the communication circuit section 19 of the primary microcomputer 10 to the communication circuit section 31 of the secondary microcomputer 30, to enable serial communication between the primary microcomputer 10 and secondary microcomputer 30. Specifically, as illustrated conceptually in FIG. 1, the concurrent event will be assumed to consist of the first rising edge of that clock signal CLK after system initialization begins.

That is to say, at the time point when the clock signal CLK begins to be transmitted by the primary microcomputer 10 and received by the secondary microcomputer 30, the interrupt request section 23 and exception processing section 25 of the primary microcomputer 10 initiate interrupt processing whereby the time counter 21 is reset to an initial count value, which will be assumed to be zero. At the same time, i.e., when the clock signal CLK begins to be received by the secondary microcomputer 30, the interrupt request section 37 and exception processing section 39 of the secondary microcomputer 30 initiate interrupt processing whereby the time counter 35 is reset to an initial count value, which will again be assumed to be zero.

In that way, it is ensured that the secondary microcomputer 30 can use the time point value (count value) TM1 supplied from the primary microcomputer 10 in conjunction with a current time value (count value) produced by the time counter 35, to calculate a communication delay amount as the amount of time that has elapsed between acquiring a detection value from the throttle position sensor 5 by the microcomputer 10 and use of that detection value in a calculation operation by the monitoring processing section 43 of the secondary microcomputer 30.

These resetting operations will be described in greater detail in the following.

In the primary microcomputer 10, the interrupt request section 23 monitors the operating condition of the communication circuit section 19, and sends a specific type of interrupt request to the exception processing section 25 when the above-described concurrent event occurs. On receiving the interrupt request, the exception processing section 25 executes a corresponding interrupt handling routine, i.e., an exception servicing routine, which includes processing for resetting the time counter 21.

Figure 4:
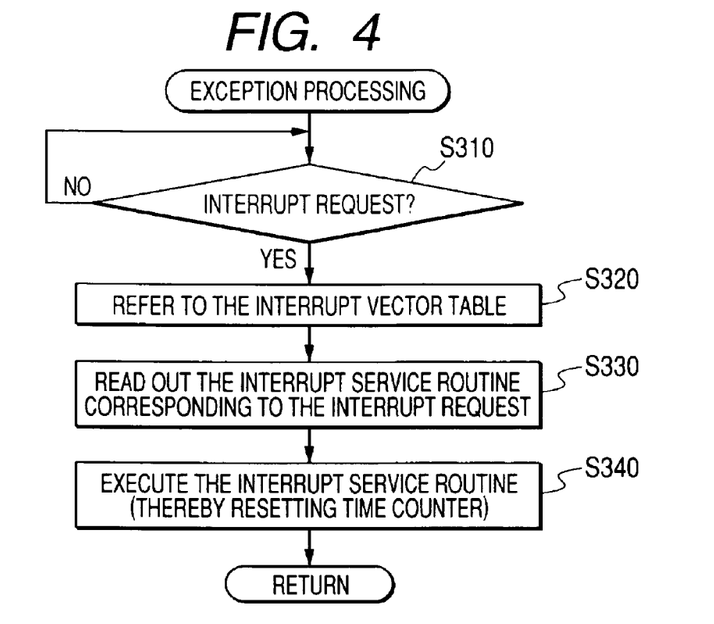
FIG. 4 is a flow diagram of interrupt handling processing that is executed at each commencement of transmitting or receiving of data, by the primary microcomputer and by a secondary microcomputer of the embodiment.

FIG. 4 is a flow diagram of a processing routine that is executed by the exception processing section 25 in response to detection of the concurrent event. Firstly, in step S310, the exception processing section 25 waits to receive the aforementioned specific type of interrupt request. When that interrupt request is received (YES in step S310) an interrupt vector table of the primary microcomputer 10 is referred to (step S320) to read out the exception servicing routine corresponding to that interrupt request. That routine is then executed (step S340), with the time counter 21 being thereby reset, whereupon execution of the routine is ended.

Similarly in the secondary microcomputer 30, the interrupt request section 37 monitors the operating condition of the communication circuit section 31, 41 and when occurrence of the above-described concurrent event occurs, the interrupt request section 37 sends the aforementioned specific type of interrupt request to the exception processing section 39. In response, the exception processing section 39 operates in the same manner as described for the exception processing section 25 of the primary microcomputer 10, i.e., executes the exception servicing routine corresponding to that interrupt request, for resetting the time counter 35.

In the same way as for the primary microcomputer 10, the exception servicing routine for handling that interrupt request is registered in the interrupt vector table of the secondary microcomputer 30.

Thus when receiving of the CLK signal by the secondary microcomputer 30 begins at system initialization, the exception processing section 39 also executes the processing routine of FIG. 4 described above, but with the time counter 35 being reset in this case, substantially concurrently with the resetting of the time counter 21.

When the secondary microcomputer 30 receives data transmitted from the primary microcomputer 10 via the communication circuit section 19, it temporarily stores the data in the buffer 32. In addition, when data are to be transmitted from the secondary microcomputer 30 to the primary microcomputer 10, the data are temporarily stored in the buffer 32 by the communication processing section 33, before being transmitted in a serial bit stream to the primary microcomputer 10 via the data communication line LN.

The communication processing section 33 of the secondary microcomputer 30, in addition to generating transmission data and temporarily registering the data in the buffer 32, repetitively performs processing to read out a data set (DAT1, with time information expressing time point TIM1 attached) that is held in the buffer 32 after having been received from the primary microcomputer 10, and stores the contents of that data set and the corresponding TIM1 information in RAM (i.e., in a different region of the RAM from that used to constitute the buffer 32).

Figure 5:
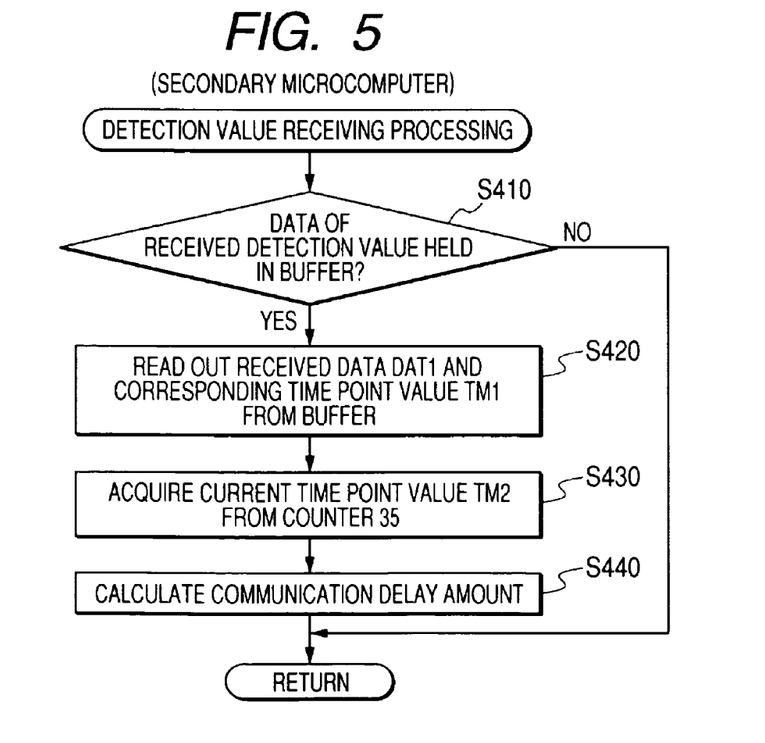
FIG. 5 is a flow diagram of a processing routine executed by the secondary microcomputer, for calculating an amount of communication delay in transmitting a detected value from the primary microcomputer to the secondary microcomputers.

FIG. 5 is a flow diagram of a detected value receiving processing routine that is repetitively executed by the communication processing section 33 to perform this. In executing this processing routine, the secondary microcomputer 30 corresponds to delay calculation means as recited in the appended claims.

In FIG. 5, firstly (step S410) the communication processing section 33 judges whether or not a data set DAT1 with attached time point information is currently held in the buffer 32. If there is a NO decision in step S410 then the processing of this routine is ended, while if such a data set is are found to be held in the buffer 32 (YES in step S410) then the contents (detected value of throttle opening amount and information expressing time point TM1) are read out from the buffer 32 and stored in RAM (step S420).

In addition, a count value expressing the current time point TP2 produced by the time counter 35 at that point (i.e., the time point at which the detected value of throttle opening amount transmitted from the primary microcomputer 10 will be used in a calculation by the secondary microcomputer 30) is acquired by the communication processing section 33 and stored in RAM, linked with the aforementioned received data (detected value of throttle opening amount and time point TM1 information) that have been stored in RAM (step S430).

The communication processing section 33 then calculates the difference between the time values TM2 and TM1, thereby obtaining the communication delay TD that was required to transfer the detected throttle opening value contained in the data set DAT1 from the primary microcomputer 10 to the secondary microcomputer 30, as TD=TM2−TM1.

This calculated value of communication delay TD is then stored in RAM, linked to the aforementioned received data (detected value of throttle opening amount and TM1) (step S440). Such a combination of a calculated delay value TD and corresponding received information (i.e., detected value of throttle opening amount and corresponding time point TM1 information) will be referred to in the following as a "received data and delay amount" set. Execution of this detected value receiving processing routine then terminates.

The A/D converter 41, which is connected to the accelerator position sensor 3 for receiving the accelerator actuation amount detection signal (analog signal), converts successive sample values of that detection signal to corresponding digital values, that are supplied to the monitoring processing section 43.

Each time that such a detected value of throttle opening amount (designated in the following as A1) is supplied to the monitoring processing section 43 from the A/D converter 41, the communication processing section 33 reads out from RAM the most recently derived one of the "received data and delay amount" sets (as defined above), and extracts from that set the time point information TM1, the corresponding delay value TD, and detected value of throttle opening amount. This detected value will be designated as B2.

The monitoring processing section 43 then performs a calculation in the same way as described above for the throttle control processing section 15 of the primary microcomputer 10, but using the values A1 and B2, to judge whether or not the throttle opening amount is appropriate. However in this case, the monitoring processing section 43 derives a compensation value C, based on the delay amount TD, and applies the compensation value C to compensate the calculation results.

If the current degree of throttle opening is found to be inappropriate, then information indicating an "abnormal" status is transmitted by the secondary microcomputer 30 to the primary microcomputer 10. The primary microcomputer 10 responds by executing error processing, including controlling the throttle opening amount to become zero.

Figure 6:
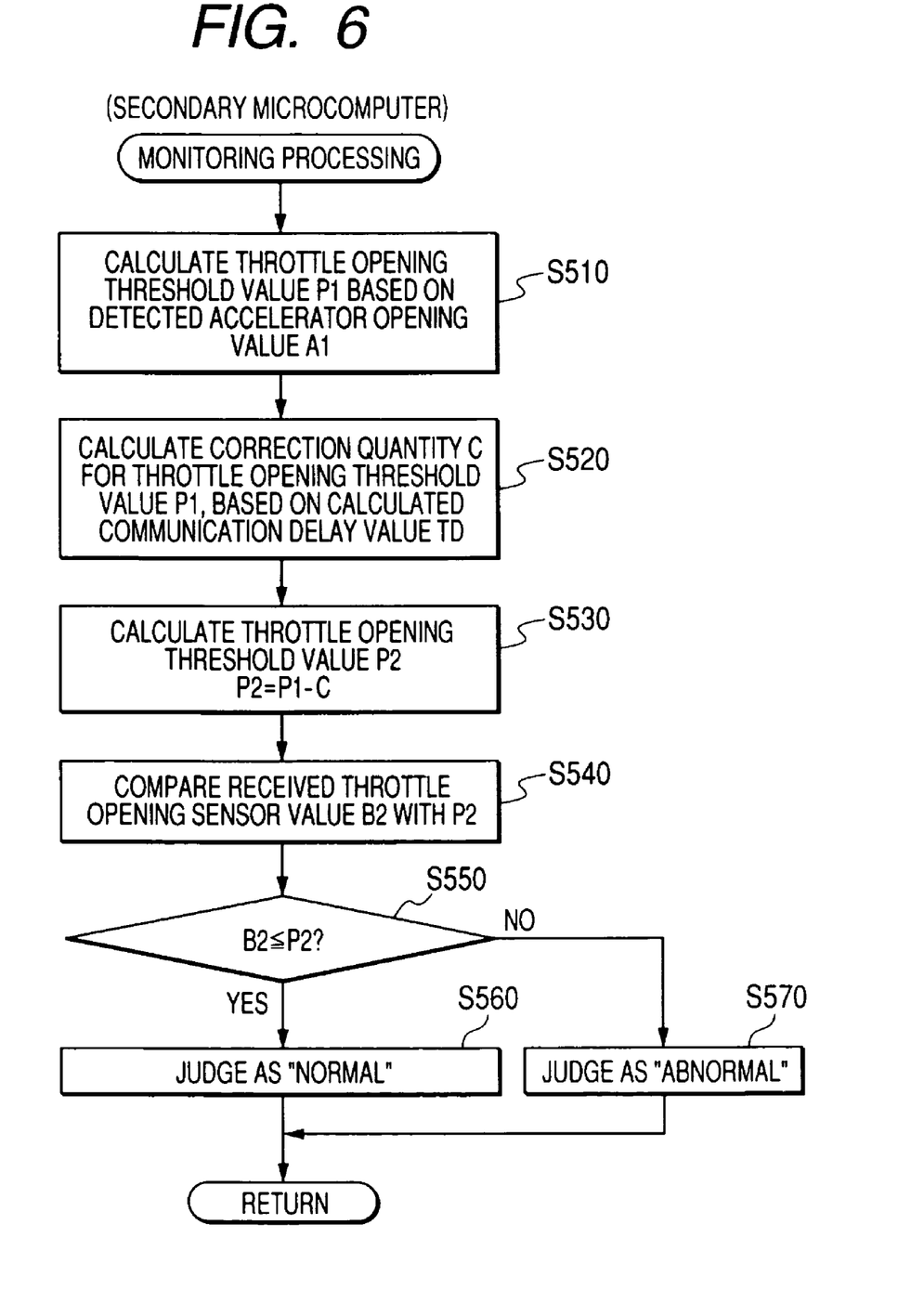
FIG. 6 is a flow diagram showing a monitoring processing routine executed by the secondary microcomputer of the embodiment.

FIG. 6 is a flow diagram of a monitoring processing routine that is executed by the monitoring processing section 43 to perform the above, for each of the "received data and delay amount" sets described above. In executing this monitoring processing routine, the secondary microcomputer 30 corresponds to second calculation means as recited in the appended claims. Firstly, (step S510) the monitoring processing section 43 calculates a throttle opening threshold value P1 based on a detected throttle opening amount value A1 which is supplied from the A/D converter 41 at that time.

Next, (step S520) the monitoring processing section 43 calculates a compensation amount C (described in detail hereinafter) for the throttle opening threshold value P1, based on the duration of the communication delay amount TD that has been derived for the received data as described above. A corrected throttle opening threshold value P2 is thereby calculated using the equation P2=P1−C (step S530).

The monitoring processing section 43 then extracts the detected value of throttle opening amount B2 contained in this received data and delay amount set, and compares B2 with the corrected throttle opening threshold value P2 (step S540), and judges whether B2 is lower than P2 (step S550).

If B2 is found to be less than or equal to P2 (i.e., YES result in step S550) then this is judged to indicate that the throttle opening amount is normal (step S560), while if B2 is found to be greater than P2 (i.e., NO result in step S550) then this is judged to indicate that the throttle opening amount is abnormal (step S570). Execution of this monitoring processing routine is ended when step S560 or S570 is completed.

The next time that this monitoring processing routine is started, it is executed using the most recently obtained detection values A1 and B2.

The purpose of deriving the correction quantity C by the secondary microcomputer 30 is to apply compensation for the delay TD between the time at which a detected value is obtained from the throttle position sensor 5 by the primary microcomputer 10 (and converted to a digitized sample value by the A/D converter 12) and the time at which that detected value is processed by the monitoring processing section 43 of the secondary microcomputer 30. If such compensation were not applied, then the monitoring processing section 43 would compare a delayed value of detected accelerator actuation amount (B2) with a throttle opening threshold value that was calculated using a currently detected accelerator actuation amount. Hence, accurate results could not be obtained.

Figure 7A:
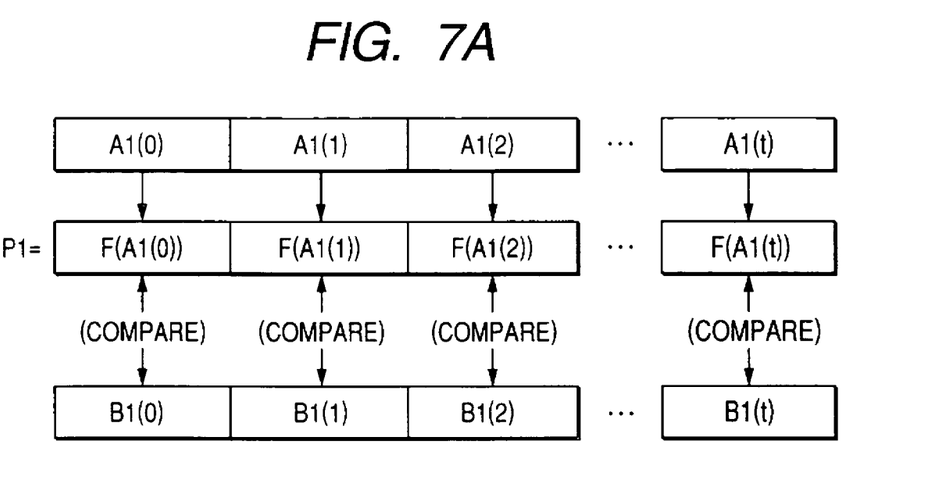
FIGS. 7A, 7B are diagrams for describing the relationship between monitoring processing that is executed by the primary microcomputer and monitoring processing that is executed by the secondary microcomputer.
Figure 7B:
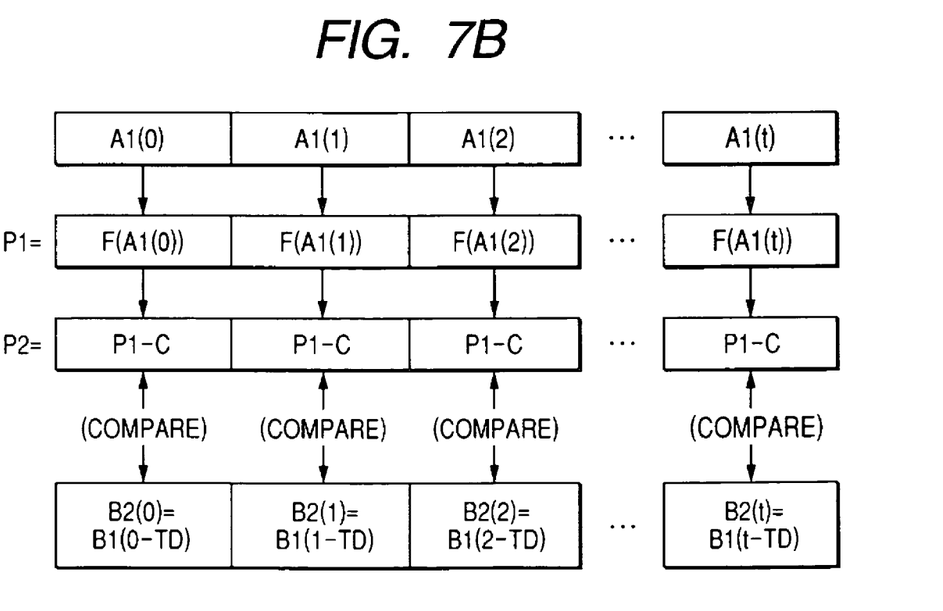
Figure 8A:
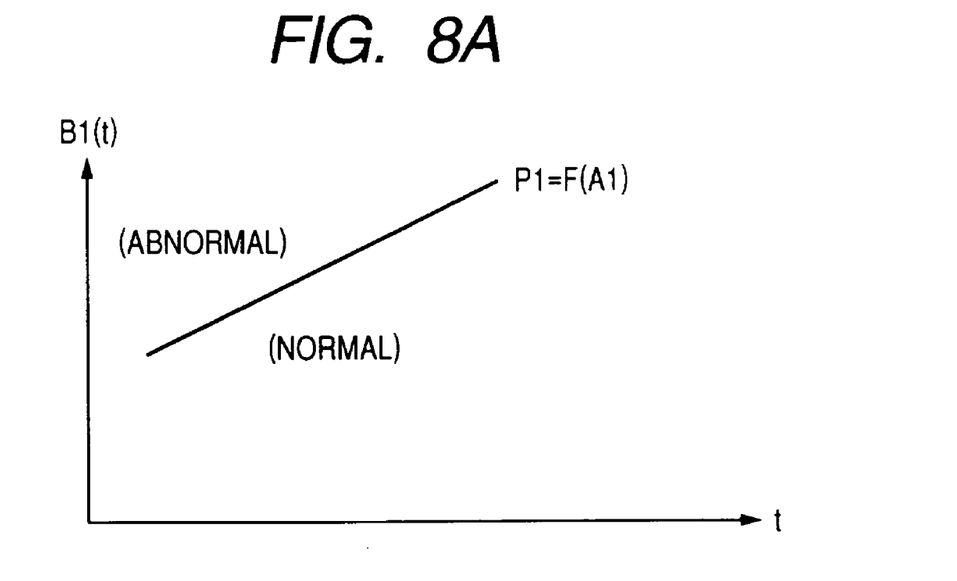
FIGS. 8A, 8B are graphs illustrating the relationship between successive values of detected throttle opening amount that are supplied to the primary microcomputer and successive values of detected throttle opening amount that are supplied to the secondary microcomputer.
Figure 8B:
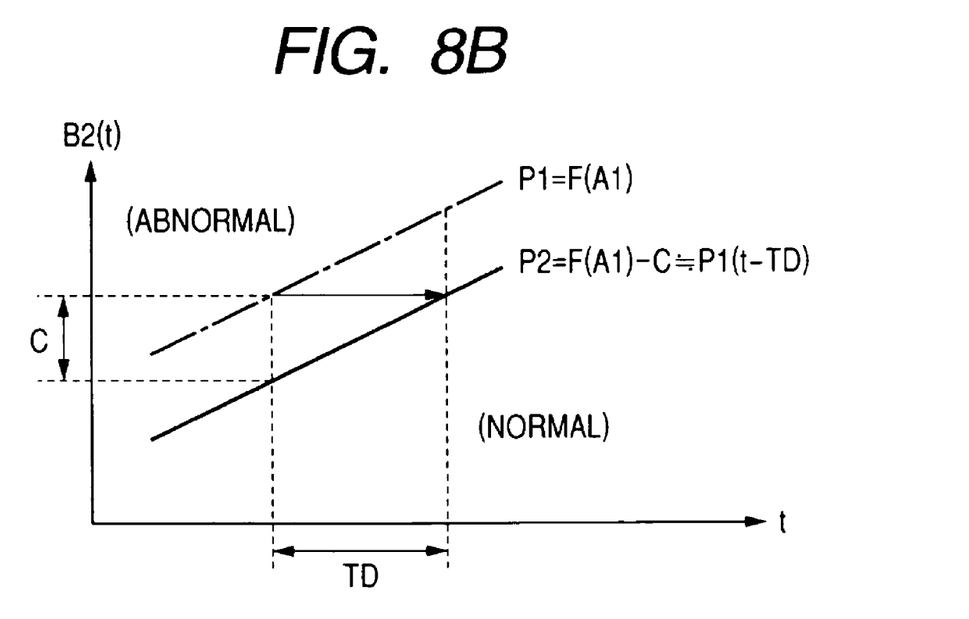

FIG. 7A is a diagram for illustrating the processing executed by the primary microcomputer 10, while FIG. 7B is a corresponding diagram illustrating the monitoring processing executed by the secondary microcomputer 30. FIG. 8A is a graph showing an example of the variation of the throttle opening threshold value P1 derived by the primary microcomputer 10, while FIG. 8b is a corresponding graph showing the variation of a corrected throttle opening threshold value P2 derived by the secondary microcomputer 30, and its relationship to the variation of P1.

Considering any time point t at which the secondary microcomputer 30 acquires a detected value B2 of throttle opening amount, that time point is delayed by the amount TD with respect to the point at which that detected value B2 was acquired by the primary microcomputer 10 from the throttle position sensor 5. That can be expressed as:

$$B2(t)=B1(t-TD)$$

The secondary microcomputer 30 derives the correction quantity C as a function G(TD) of the delay amount TD, i.e., $$C=\gamma \cdot TD$$

where γ is a constant that is determined such as to satisfy the relationship, illustrated in FIG. 8:

$$P2 \approx P1(t-TD)$$

Alternatively, a more suitable value of the correction quantity C can be derived by using a function H(A1, TD), where A1 is the detected value of accelerator actuation amount produced by the accelerator position sensor 3. As a specific example of this, the correction quantity C can be obtained as:

$$C=F(A1)-F(A1-(dA1/dt)\cdot TD)$$

By calculating the correction quantity C in that way, and performing judgement as shown in FIG. 6, the monitoring processing section 43 performs equivalent monitoring processing to that executed by the primary microcomputer 10, as illustrated in FIG. 8B.

It will be understood that the time delay which must be accurately measured with this embodiment is actually the difference between the time point at which a detected value (digitized sample value) DAT1 was produced from the A/D converter 12 and the time point at which a monitoring operation is performed by the monitoring processing section 43 using that digitized sample value together with a (newly outputted) digitized sample value produced from the A/D converter 41. In practice, there will be some delay between the point (i.e., a YES decision in step S410 of FIG. 5) at which a detected value (DAT1) and corresponding current time point TM1 information (TM1) transmitted from the primary microcomputer 10 are found to be held in the buffer 32, and the point at which that detected value DAT1 is actually used in a monitoring processing calculation by the monitoring processing section 43.

That is to say, the monitoring processing calculation can only commence after the detected value DAT1 has been read out of the buffer 32 and subsequently transferred to the communication processing section 33, and a detected value for use in the calculation has been obtained from the A/D converter 41.

Figure 9:
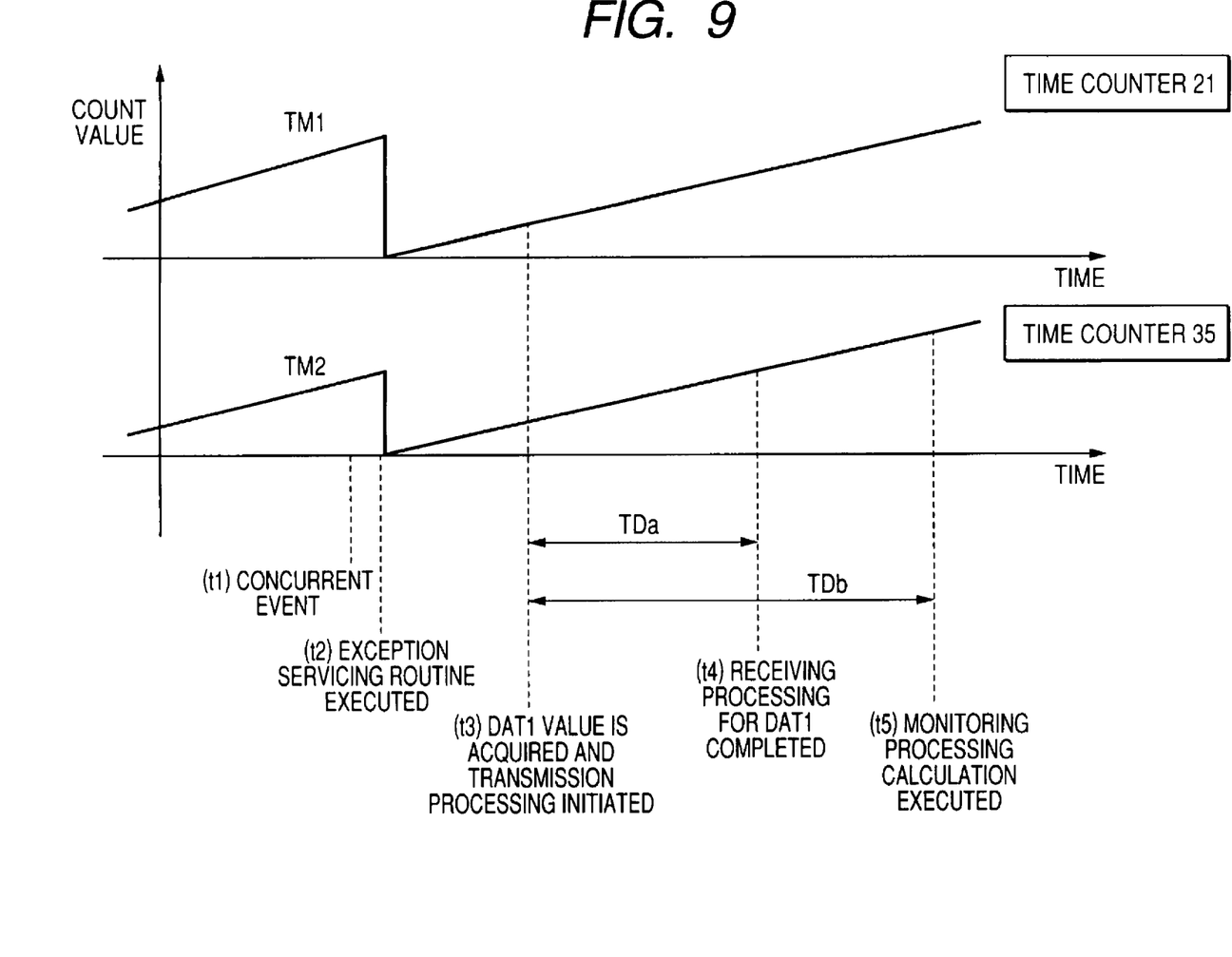
FIG. 9 is a diagram illustrating timing relationships between resetting of time counters and transfer of data between microcomputers of the embodiment.

This point is illustrated in the timing diagram of FIG. 9. Here, a concurrent event is detected at a time point t1, causing the interrupt request section 23 and exception processing section 25 of the primary microcomputer 10, and also the interrupt request section 37 and exception processing section 39 of the secondary microcomputer 30, to initiate execution of an exception servicing routine whereby each of the time counters 21 and 35 is reset at a time point t2. Subsequently, at a time point t3, an output value from the A/D converter 12 of the primary microcomputer 10 is acquired, and processing for transmitting that value to the secondary microcomputer 30, expressed as data DAT1, is initiated. At a subsequent time point t4, the secondary microcomputer 30 detects that data DAT1 and corresponding time point data (TM1) have been received and set into the buffer 32. Thereafter, at time point t5, an output value that is currently produced from the A/D converter 41 is used in conjunction with the value (B2) expressed by the newly received data DAT1, to perform a monitoring calculation operation as described above As can be understood from FIG. 9, because each of the time counters 21 and 35 measure elapsed time values from a common reference point on the time axis (i.e., a point when concurrent resetting of the counters occurs), a count value previously derived by one time counter can be compared with a currently derived count value of the other time counter, to obtain a difference value that accurately represents an elapsed time interval.

In FIG. 9, the time delay between the points t3 and t4, i.e., the delay until receiving processing of DAT1 and the TM1 time point information is completed by the secondary microcomputer 30, is designated as TDa, while the total delay (from acquisition of a detected throttle opening amount value by the microcomputer 10 until a monitoring calculation is executed by the secondary microcomputer 30 using that value) is designated as TDb.

It can be understood that it is possible to either obtain the value of TDb either:

(a) as the difference between the received time point value (TM1) and the count value (TM2) of the time counter 35 at the time point when the corresponding monitoring calculation is executed by the monitoring processing section 43, or (b) by obtaining the difference between the received time point value (TM1) and the time point value (TM2) of the time counter 35 at the time when it is confirmed that a new throttle opening amount value and corresponding time point value (DAT1 and TM1) have been received and set into the buffer 32 of the secondary microcomputer 30, and then adding a predetermined value to the obtained difference, to obtain an estimated value for the (total) communication delay amount TDb.

In either case, as can be understood from FIG. 9, the substantially simultaneous resetting of the time counters 21 and 35 in response to occurrence of the concurrent event serves to ensure that a time point expressed by a count value of the time counter 21 can be accurately compared with a current time point that is expressed by a count value of the time counter 35, for obtaining an amount of communication delay that includes a delay in transmitting data from the primary microcomputer 10 to the secondary microcomputer 30.

With the above embodiment the communication processing section 17 of the primary microcomputer 10 repetitively transmits, to the secondary microcomputer 30, successive detected values that are obtained from the throttle position sensor 5, i.e., values that are the object of calculation processing performed by the secondary microcomputer 30. It should be noted that this repetitive transmission of detected values is not necessarily performed with a specific fixed repetition period.

Moreover with the above embodiment, each time such a detected value obtained from the throttle position sensor 5 is transmitted from the secondary microcomputer 30, it is sent (in a data set DAT1) in a condition to being linked to a time point value (TM1) that is obtained from the time counter 21, identifying the time axis position at which the detected value was acquired from the throttle position sensor 5. When the secondary microcomputer 30 receives such a detected value of throttle opening amount, and the corresponding linked time point information TM1, it calculates the time (TD) that has been required to transfer the detected value data (together with the corresponding time point information TM1) between the microcomputers 10 and 30, with that calculation being based, as described above, on the received time point information TM1.

The secondary microcomputer 30 can thereby utilize the delay time TD value to compensate each calculated value of throttle opening threshold value, using a correction quantity C that is derived based on the value of delay time TD, as shown in the flow diagram of FIG. 6 described above. In that way, the secondary microcomputer 30 can compare each detected value of throttle opening amount, received from the primary microcomputer 10, with an appropriate throttle opening threshold, and so can accurately judge (as a doublecheck on the corresponding judgement performed by the throttle control processing section 15 of the primary microcomputer 10) whether the detected throttle opening amount is appropriate, with a high degree of accuracy of judgement being possible.

It can be understood from the above that it is a basic advantage of the present invention that it is not necessary to derive beforehand an approximate value for the communication delay amount TD based on theoretical calculations. Instead, the actual value of TD is directly obtained by the secondary microcomputer 30, by utilizing the time point information TM1 that is sent linked to each transmitted value of detected throttle opening amount.

The invention is not limited to the above embodiment, but is applicable in general to a system in which a plurality of information processing apparatuses mutually communicate. The principles described above could for example be applied to a system having a plurality of ECUs which mutually exchange data, for obtaining the amount of delay in transferring data from one ECU to another.

As a specific example, the invention could be applied to a system in which a plurality of ECUs interchange data by using a reference signal such as a CAN (Control Area Network) signal. In that case, the reference signal performs the function of the CLK signal of the above embodiment, and could be used to reset respective time counters in the ECUs.

Moreover, although the above embodiment has been described for the case in which the respective time counters of information processing apparatuses such as microcomputers are reset concurrently only at the time of system initialization, it would be equally possible to perform such resetting repetitively (i.e., in response to successive detections of the concurrent event), at regular or irregular intervals. This will be necessary for example if it cannot be ensured that the respective time counters operate (count) from timing clock signals that are precisely identical in frequency.

It should thus be understood that the above description of the preferred embodiment is to be understood in a descriptive and not in a limiting sense, and that various modifications or alternative configurations could be envisaged which fall within the scope claimed for the present invention.

What is claimed is:

1. An information processing system comprising a first computer and second computer which mutually communicate via a data communication line, said first computer comprising a first time counter which measures current time values and said second computer comprising a second time counter configured for current time values, said first computer comprising first communication means for communicating with said second computer via said data communication line and said second computer comprising second communication means for communicating with said first computer via said data communication line, wherein:

said first communication means periodically or at irregular intervals transmits a first time point value via said data communication line to said second communication means, said first time point value expressing a current time point as measured by said first time counter prior to commencement of said transmission operation, and said second computer comprises delay calculation means for receiving said first time point value from said second communication means, and for calculating a communication delay amount based on a difference between said first time point value and a second time point value, said second time point value being measured as a current time point by said second time counter subsequent to reception of said first time point value, said communication delay amount thereby including a time interval that elapses in transmitting data from said first computer to said second computer via said data communication line.

2. An information processing system according to claim 1, wherein:

said first communication means of said first computer periodically or at irregular intervals transmits respective data sets to said second communication means of said second computer via said data communication line, each of said data sets including information other than time point information; and said second computer comprises second calculation means for performing calculation processing based on contents of of said data sets and to apply compensation to said calculation processing, based upon said delay amount.

3. An information processing system according to claim 2, wherein:

said first computer receives input values that are produced by an input apparatus; and, said input values constitute said information other than time information included in said data sets.

4. An information processing system according to claim 3, wherein successive ones of said input values are conveyed in respective ones of said data sets.

5. An information processing system according to claim 4, wherein:

said input apparatus comprises a first sensor, for deriving successive detected values of a first physical quantity and a second sensor for deriving successive detected values of a second physical quantity, and said input values comprise said detected values of the first physical quantity;

said second computer is coupled to receive said detected values of the second physical quantity from said second sensor, said second physical quantity being different from said first physical quantity; and, said second calculation means of the second computer repetitively performs a calculation based on a combination of a detected value of said second physical quantity, obtained at a current time point as measured by said second time counter, and a received detected value of said first physical quantity, and applies compensation to a result of said calculation, with said compensation being based upon said delay amount.

6. An information processing system according to claim 2, wherein:

each of said data sets includes a current time point value which has been measured by said first time counter and which corresponds to said information other than time point information included in said data set.

7. An information processing system according to claim 1, wherein: said first computer comprises first resetting means responsive to each occurrence of a predetermined event for resetting said first time counter and said second computer comprises second resetting means responsive to each occurrence of said predetermined event for resetting said second time counter.

8. An information processing system according to claim 1, wherein:

said first computer comprises first resetting means responsive to each of occurrence of a first predetermined event for resetting said first time counter and said second computer comprises second resetting means responsive to each occurrence of a second predetermined event for resetting said second time counter, each occurrence of said second predetermined event being substantially concurrent with an occurrence of said first predetermined event.

9. An information processing system according to claim 8, wherein said first communication means transmits a clock signal to said second communication means, said first resetting means detects a commencement of said transmitting of the clock signal by the first communication means as an occurrence of said first predetermined event, and said second resetting means detects a commencement of receiving said clock signal by the second communication means as an occurrence of said second predetermined event.

10. An information processing system comprising a first computer and a second computer which mutually communicate via a data communication line and comprise respective ones of a first time counter and second time counter, each of said first time counter and said second time counter measuring current time values, said first computer comprising first communication means communicating with said second computer via said data communication line and said second computer comprising second communication means configured for communicating with said first computer via said data communication line, wherein:

said first computer periodically or at irregular intervals acquires successive first data values and said first communication means transmits each of said first data values via said data communication line to said second communication means, each of said first data values being transmitted in conjunction with a corresponding time point value, said corresponding time point value being measured by said first time counter as a value of current time at which said first data value is acquired by said first computer, and said second computer comprises delay calculation means receiving said corresponding time point values from said second communication means and for calculating, for each of said first data values, a corresponding communication delay amount as a difference between said corresponding time point value and a current time value, said current time value being measured by said second time counter.

11. An information processing system according to claim 10, wherein said second computer periodically or at irregular intervals acquires successive second data values, said second computer comprises second calculation means for receiving said first data values from said second communication means, and for performing a calculation operation utilizing a currently acquired one of said second data values in conjunction with a currently received one of said first data values, and said second calculation means applying compensation to said calculation operation, with said compensation being based upon said corresponding communication delay amount.

12. An information processing system comprising a first computer and a second computer which mutually communicate via a data communication line and comprise respective ones of a first time counter and second time counter, each of said first time counter and said second time counter measuring current time values, said first computer comprising first communication means communicating with said second computer via said data communication line and said second computer comprising second communication means for communicating with said first computer via said data communication line, said first computer coupled to each of a first sensor and a second sensor and acquiring a first detection value from said first sensor and a second detection value from said second sensor at each of successive time points, said second computer coupled to said second sensor and acquiring said second detection value from said second sensor at each of said successive time points, wherein:

said first computer comprises first calculation means for performing a predetermined calculation operation using said first detection value and said second detection value, and for evaluating a result of said calculation, said first communication means is transmitting said first detection value via said data communication line to said second communication means in conjunction with a corresponding time point value, said corresponding time point value being measured by said first time counter as a point at which said first detection value and said second detection value are acquired by said first computer, said first computer comprises first calculation means for performing a first calculation operation, applying said first detection value and said second detection value in said first calculation operation, said second computer comprises delay calculation means for receiving said corresponding time point value from said second communication means, obtaining a current time point value measured by said second time counter, and calculating a communication delay amount as a difference between said current time point value and said corresponding time point value, and said second computer comprises second calculation means for calculating a compensation amount based upon said communication delay amount, for receiving said first detection value from said second communication means as a received first detection value, and for performing a second calculation operation, applying said received first detection value and said second detection value in said second calculation operation;

wherein said second calculation operation differs from said first calculation operation only in being modified in accordance with said compensation amount.

13. An information processing system according to claim 12, wherein:

said first detection value expresses an amount of throttle opening and said second detection value expresses an amount of accelerator actuation;

said first calculation operation comprises deriving a first threshold value based upon said second detection value, comparing said first detection value with said first threshold value, and judging whether said throttle opening amount is appropriate based upon a result of said comparison; and, said second calculation operation comprises deriving said first threshold value based upon said second detection value, modifying said first threshold value in accordance with said compensation amount to obtain a modified threshold value, comparing said received first detection value with said modified threshold value, and judging whether said throttle opening amount is appropriate based upon a result of said comparison.

* * * * *

UNITED STATES PATENT AND TRADEMARK OFFICE
CERTIFICATE OF CORRECTION

PATENT NO.      : 7,949,120 B2                                      Page 1 of 1
APPLICATION NO. : 11/371161
DATED           : May 24, 2011
INVENTOR(S)     : Nobuaki Narita It is certified that error appears in the above-identified patent and that said Letters Patent is hereby corrected as shown below:

Column 14, line 60 (claim 1), change "configured for" to "which measures;"

Column 15, line 27 (claim 2), change "of of" to "of;"

Column 16, line 34 (claim 10), after "means" insert --for;--

Column 16, line 37 (claim 10), after "means" delete "configured;"

Column 16, line 50 (claim 10), after "means" insert --for;--

Column 17, line 11 (claim 12), after "means" insert --for;-- and

Column 17, line 27 (claim 12), after "means" delete "is."

Signed and Sealed this
Twenty-seventh Day of September, 2011

David J. Kappos
*Director of the United States Patent and Trademark Office*